United States Patent
Morishita

(10) Patent No.: US 7,430,132 B2
(45) Date of Patent: Sep. 30, 2008

(54) MEDIUM VOLTAGE INVERTER SYSTEM

(75) Inventor: Takashi Morishita, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 195 days.

(21) Appl. No.: 11/356,130

(22) Filed: Feb. 17, 2006

(65) Prior Publication Data
US 2007/0195567 A1 Aug. 23, 2007

(51) Int. Cl.
H02H 7/122 (2006.01)

(52) U.S. Cl. ............... 363/55; 363/34; 363/36; 363/37

(58) Field of Classification Search ............... 363/55, 363/109, 34, 36, 37, 56.01, 137, 4, 2, 56.03; 318/801, 768
See application file for complete search history.

(56) References Cited

U.S. PATENT DOCUMENTS

| 4,975,822 | A | * | 12/1990 | Lipman | ............... 363/40 |
| 5,625,545 | A | | 4/1997 | Hammond | |
| 6,014,323 | A | * | 1/2000 | Aiello et al. | ............... 363/71 |
| 6,028,779 | A | * | 2/2000 | Sakamoto et al. | ............... 363/55 |
| 6,058,032 | A | * | 5/2000 | Yamanaka et al. | ............... 363/71 |
| 6,075,717 | A | * | 6/2000 | Kumar et al. | ............... 363/87 |
| 6,377,478 | B1 | | 4/2002 | Morishita | |
| 6,411,530 | B2 | | 6/2002 | Hammond et al. | |

FOREIGN PATENT DOCUMENTS

EP 0 802617 A2 10/1997

* cited by examiner

Primary Examiner—Bao Q. Vu
Assistant Examiner—Nguyen Tran
(74) Attorney, Agent, or Firm—Banner & Witcoff, Ltd.

(57) ABSTRACT

A medium or high voltage multi-inverter system is described, in which multiple inverter cells are included in a phase line to increase the voltage level supported by the system, and support higher voltage loads such as AC three-phase motors. In one configuration, five cells are used: two each in two phase lines, and one in a third phase line. In one of the phase lines having two cells, a second cell is series connected in reverse polarity, generates a phase matching the phase of the third line, while the other cell in the phase line generates an output with a different phase. One or more failure switches may be included to allow for short-circuiting of the output poles of one or more of the cells, so that in case of cell failure, the system can continue operation. For example, switches may be employed for the second cells in the two phase lines having two cells, and those cells may be available as spare cells in case of a cell failure.

13 Claims, 14 Drawing Sheets

FIG. 2A

| | MODE -1 | MODE -2 | MODE -3 | MODE -4 | MODE -5 | MODE -6 | MODE -7 | MODE -8 | MODE -1 | MODE -2 |
|---|---|---|---|---|---|---|---|---|---|---|
| GTR 1A | ON | ON | ON | | | | | | ON | ON |
| GTR 1B | ON | ON | ON | ON | | | | ON | ON | ON |
| GTR 2A | | | | ON | ON | ON | ON | ON | | |
| GTR 2B | | | | | ON | ON | ON | | | |
| GTR 3A | ON | | | | | | ON | ON | ON | |
| GTR 3B | ON | ON | | | | ON | ON | ON | ON | ON |
| GTR 4A | | ON | ON | ON | ON | ON | | | | ON |
| GTR 4B | | | ON | ON | ON | | | | | |
| $V_{U0-V0}$ | 0 | $+e_{dc}$ | $+2e_{dc}$ | $+e_{dc}$ | 0 | $-e_{dc}$ | $-2e_{dc}$ | $-e_{dc}$ | 0 | $+e_{dc}$ |

FIG. 8

| | Power Cell Rating Voltage - kVA | Output Voltage | | | Output kVA | |
|---|---|---|---|---|---|---|
| | | CTT-U ON CTT-V | CTT-U OFF CTT-V | | OFF CTT-U CTT-V | ON CTT-U OFF CTT-V |
| | | $e_1 = \sqrt{3}\,e$ (1.73 e) | $e_2 = \sqrt{7}\,e$ (2.64 e) | | | |
| One Example | 2.5 kV - 660kVA | 4.3 kV | 6.6 kV | | 1980 kVA | 3039 kVA |

MEDIUM VOLTAGE INVERTER SYSTEM

BACKGROUND

Since before Ben Franklin's historic kite-flying experiment in 1752, humans have been unlocking and unraveling the many mysteries surrounding electricity. Today, nearly every gadget and piece of machinery uses electricity to operate, spanning from the very small (e.g., nano-robots) to the very large (e.g., industrial drives and other high-power machinery). The present application relates to the latter. In particular, this application relates generally to medium- and high-voltage motors, such as three-phase AC (alternating current) motors.

Today's power plants generate three-phase AC electricity, and that electricity is stepped down and/or rectified to provide the specific level and type of power needed for a given application. In the case of driving larger motors, this may be done using inverter cells. For example, FIG. 1 depicts an example configuration for driving a three-phase AC motor. As shown in the figure, three-phase electricity may be supplied by the local power company to an input side of a transformer 101. The output side of the transformer 101 may include secondary windings 102a-f, each of which may provide three-phase AC input to three power cells 103a-c. In some situations, the same pair of secondary windings (e.g., 102a-b) may supply inputs to all three cells 103. The transformer 101 serves to isolate the power cells 103 from the power source, and may also be used to step up or down the voltage level and/or adjust the phase output.

The power cells 103a-c receive the two sets of three-phase power inputs, and each provides two output terminals (e.g., Uo and Vo). One of these terminals (Vo) is tied to the corresponding terminal in the other cells, while the other terminal (Uo) provides an output from the cell to a phase input on a three-phase load, such as motor 104. These outputs of the three cells 103 may be identical in amplitude, and may be offset from one another by 120 degrees of phase.

The highest power level supportable by the FIG. 1 configuration depends on the circuit components used in the power cells 103, and their various voltage ratings. Higher rated components will support higher voltage levels, but such components are more expensive, and the output voltage required by some applications can even exceed the highest-rated components. Accordingly, there is a need for higher power level configurations that can perhaps minimize the cost by not requiring these higher power level cells.

SUMMARY

The following summary generally addresses many of the features described herein, but is not intended to limit the scope of this disclosure or identify features of greater importance to the claims herein.

The systems and features described herein relate generally to an improved circuit design in which multiple single-phase inverters may be coupled to provide support for higher voltages. In some aspects, multiple inverters receive two isolated three-phase power inputs, and are series-connected in a given phase line to support higher voltage levels.

In some aspects, a three-phase motor may have non-identical configurations in each of its phase input lines. In a first input line, two single-pole NPC inverter cells may be serially connected such that their voltage amplitudes stack and their phases are coincident. The output of that phase line is provided to the first phase input of the motor. In a third input line, a single cell is used to supply the third phase input to the motor.

In the second input line, two inverter cells may be placed in the line, but may be connected in reverse polarity such that they have corresponding, connected output poles, and where the other output of the second cell supplies the second phase input to the motor. In this second input line, the second cell may also supply a different phase voltage from the first cell in the line. In particular, the second cell may supply a phase that is coincident with the phase of the single cell used in the third input line. In some aspects, a circuit having five single phase inverters supplied with three-phase power at 120 degrees phase separation and interconnected with the reverse-connected second phase line may support the same 6.6 kV application otherwise supported by a six-inverter configuration.

In another aspect, one or more failure switches may be added to circuit configurations having more than one cell in a given phase line. Failure switches may close across output terminals of one or more of the inverter cells, and may be closed in the event of a failure in one of the cells. In a cell failure in a configuration having more than three cells, the circuit may be dynamically reconfigured to operate at a three-cell level (e.g., one cell per phase line) by closing the failure switches to result in a three-cell configuration. The cells whose terminals are shorted together by the closed switch may then be removed (if they failed) or used as a spare to replace another cell.

Additional features described herein will be addressed in greater detail below.

BRIEF DESCRIPTION OF THE DRAWINGS

FIGS. 2a and 2b illustrate tables showing typical transistor switching patterns of a single-phase neutral point inverter of FIG. 2. FIG. 2a illustrates a table of eight switching modes of transistors to generate square wave output, and FIG. 2b illustrates a table of switching of eight transistors for PWM wave output

FIG. 8 illustrates a table showing example power output levels that may be achieved using the FIG. 4 and/or FIG. 7 configuration.

DETAILED DESCRIPTION

Figure 1:
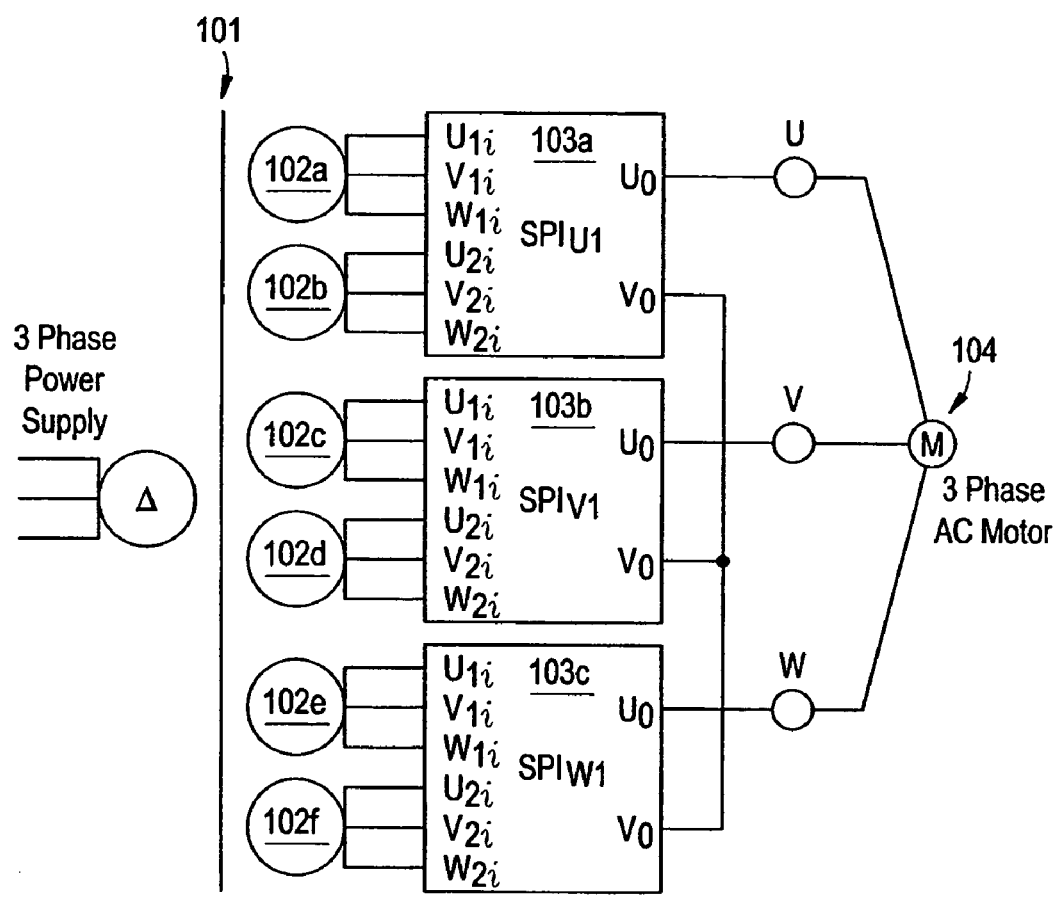
FIG. 1 illustrates an example configuration in which a three-phase AC motor is controlled by three single-phase inverters in a wye connection.

The configuration in FIG. 1, which may be referred to as a three-phase inverter single-pole wye-connection system, may be used to drive the three-phase AC motor 104. Different types of power cells 103 may be used, such as single-phase neutral point clamp (NPC) cells and six-step 3-level single-phase inverter cells. For higher output voltages, single-phase NPC cells may be used.

Figure 2:
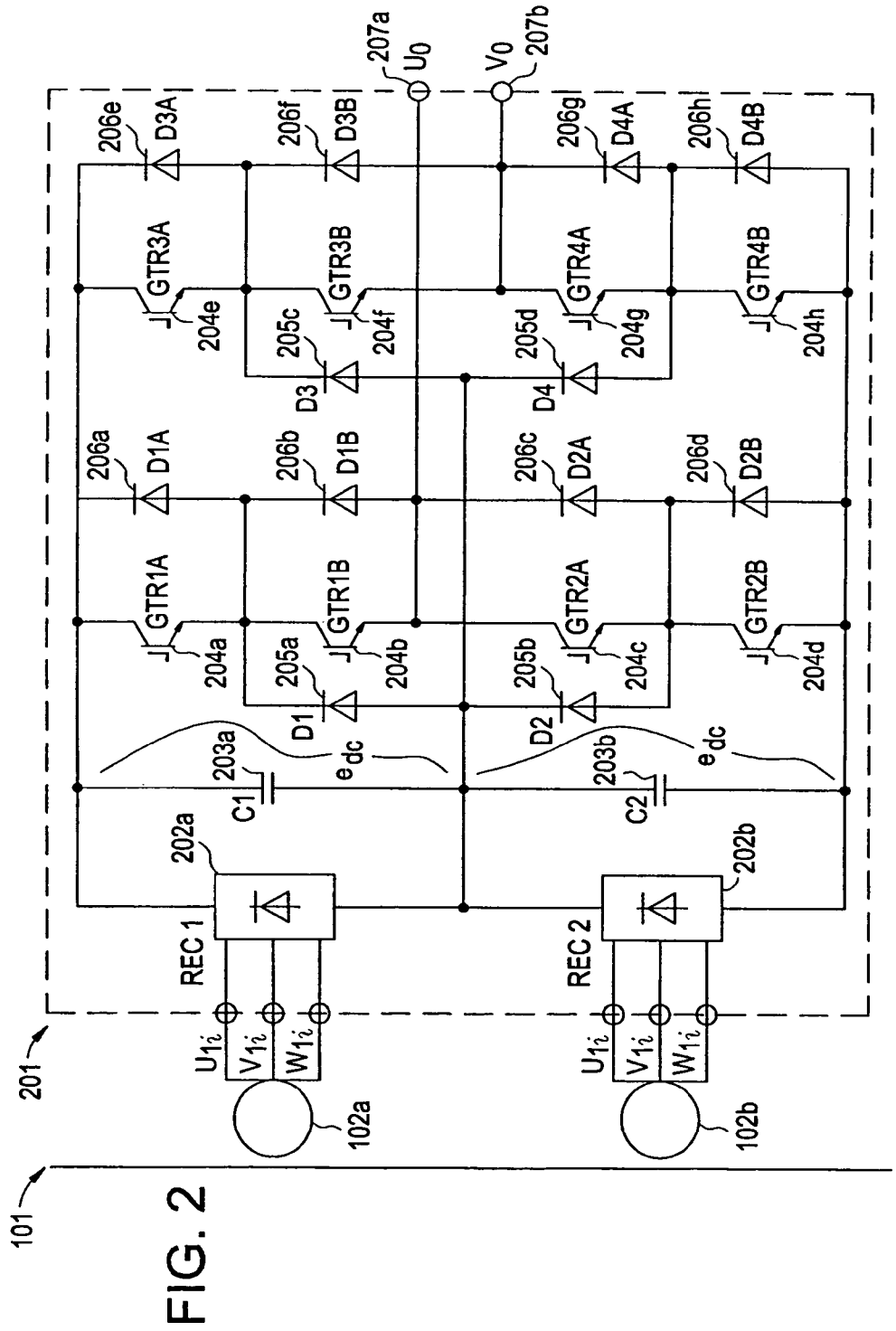
FIG. 2 illustrates a single-phase neutral point clamp inverter cell that may be used in the FIG. 1 configuration.

FIG. 2 illustrates an example single pole NPC inverter cell that may be used in a configuration as shown in FIG. 1. As shown in FIG. 2, the inverter cell 201 may be provided with two sets of three-phase AC input voltages, such as from secondary windings 102a-b shown in FIG. 1. The U, V and W input phases may be separated by a phase angle, such as 120 degrees, and the two groups of isolated inputs may be supplied to separate rectifier bridges 202a-b (REC1 and REC2). The rectifier bridges convert the two isolated received AC powers into DC (direct current) powers.

Figures 1, 2B:
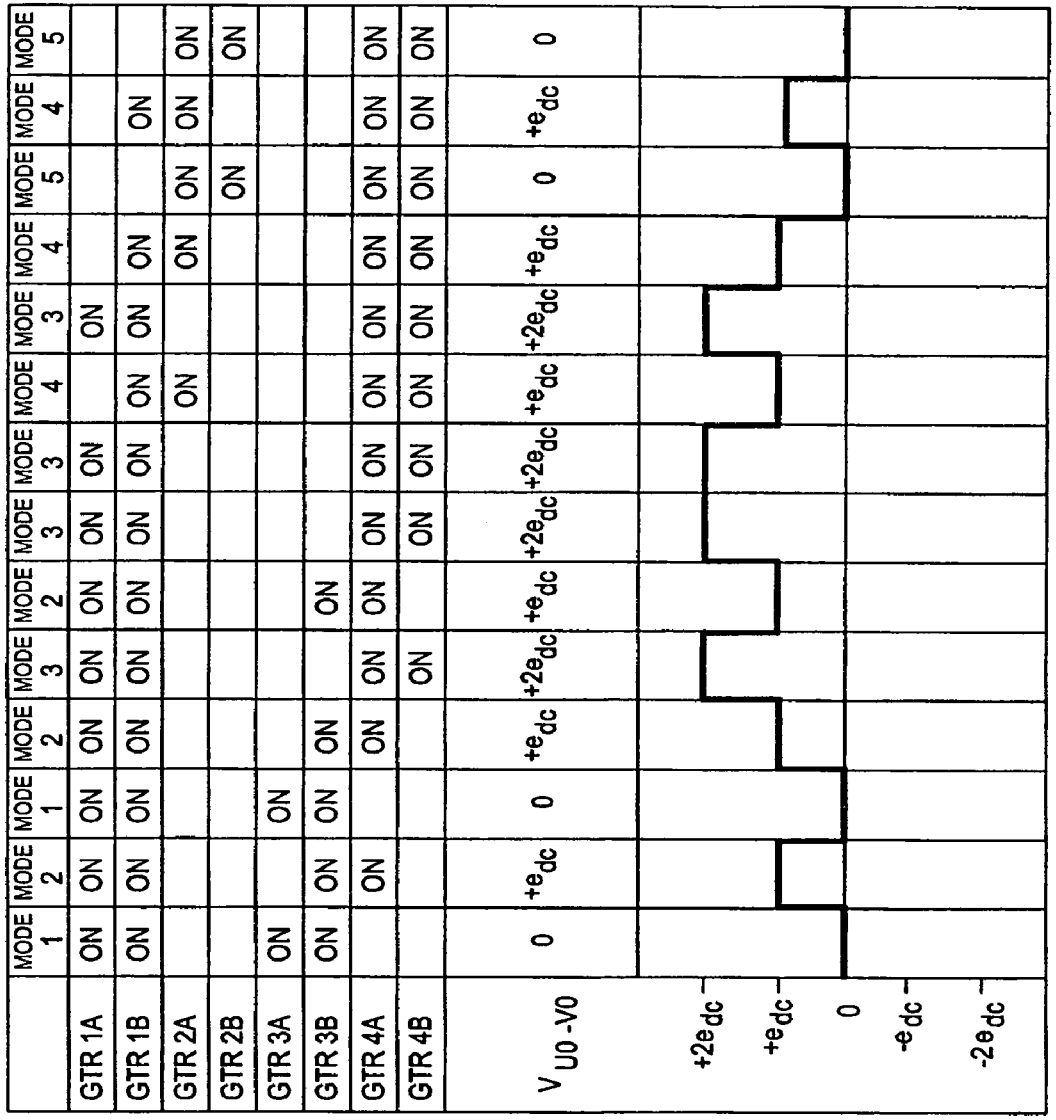
Figures 2, 2B:
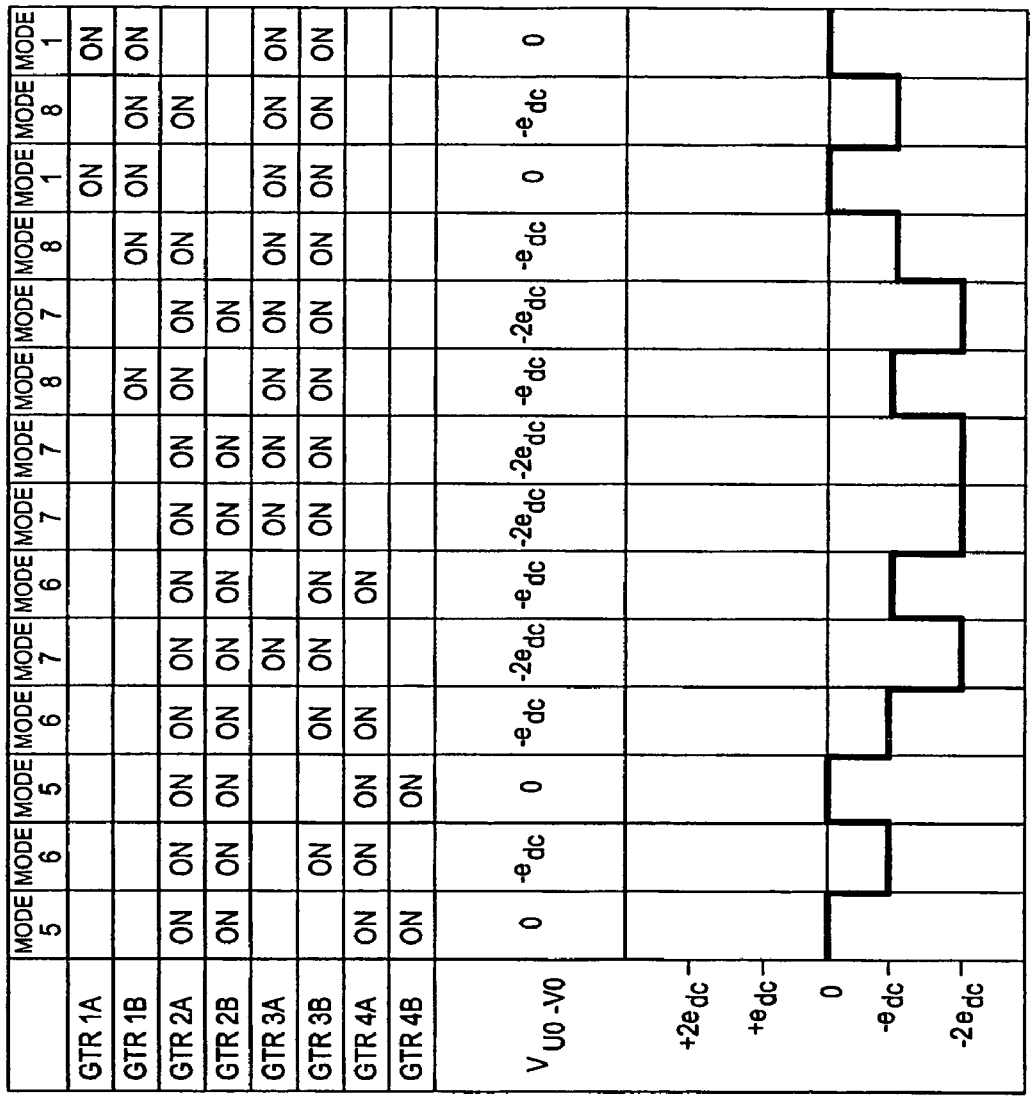

The DC output from the rectifier bridges may contain unwanted current ripples, and smoothing capacitors 203a-b (C1 and C2) may smooth out the DC powers by removing such unwanted spikes. The smoothed DC power is then supplied to an inverter stage, which may include inverter transistors 204a-h (GTR1A, GTR1B, GTP2A, GTR2B, GTR3A, GTR3B, GTR4A and GTR4B), neutral clamp diodes 205a-d (D1, D2, D3 and D4) and free-wheeling diodes 206a-h (D1A, D1B, D2A, D2B, D3A, D3B, D4A and D4B) as shown, for conversion back into AC power. This conversion is done under the control of a control circuit (not shown), which supplies control signals to the various transistors 204a-h in the inverter stages to turn them on and off in a timed sequence to cause the desired output. FIG. 2A is an example of an on-off timing sequence for the inverter transistors used in the FIG. 2 configuration to generate five-level square-wave output, and FIG. 2B is an example of an on-off timing sequence that can be used to generate five-level PWM output. As referenced, V(Uo-Vo) is the voltage between terminal 207a (Uo) and 207b (Vo), and "edc" is the voltage of capacitors 203a (C1) and 203b (C2). This output is available from each inverter cell 201 in FIG. 2 at its two poles, shown as a first pole 207a (Uo) and a second pole 207b (Vo), which may also be referred to as the cell's left and right poles. These poles may be referred to as "opposite" one another as a convenient way to differentiate them, although the term "opposite" does not necessarily refer to or define differences in voltage amplitude or phase angle between the poles.

Figure 2C:
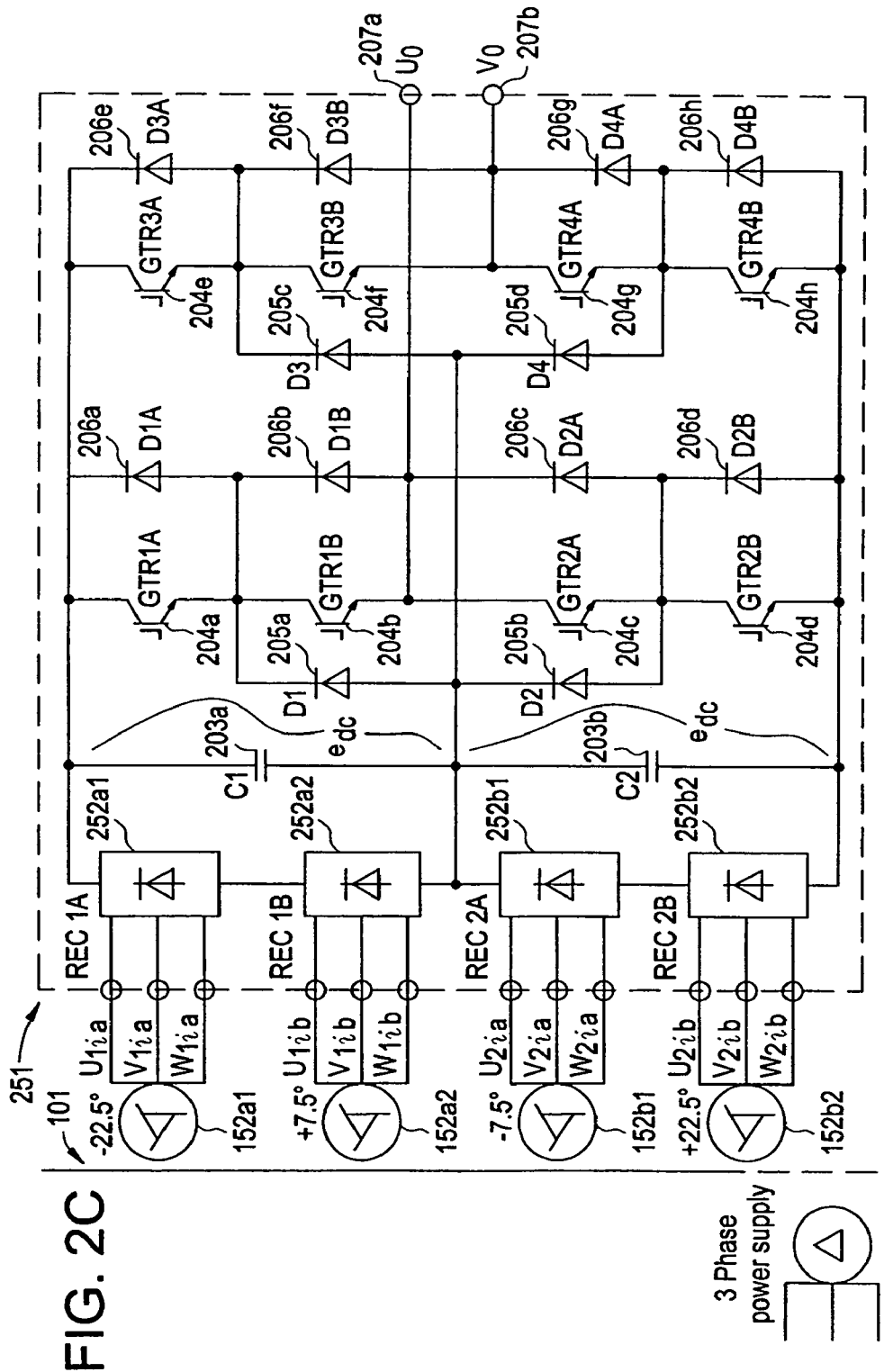
FIG. 2c illustrates a single-phase neutral point inverter cell that may reduce input harmonic current by using additional rectifier bridges and additional transformer windings.

FIG. 2C illustrates an example optional configuration 251 for cell 201 that can be used to reduce input harmonic current of a three phase power supply. The FIG. 2C arrangement resembles the FIG. 2 cell 201, with inverter transistors 204a-h (GTR1A, GTR1B, GTR2A, GTR2B, GTR3A, GTR3B, GTR4A and GTR4B), neutral clamp diodes 205a-d (D1, D2, D3 and D4) and free-wheeling diodes 206a-h (D1A, D1B, D2A, D2B, D3A, D3B, D4A and D4B) arranged in the same configuration. The FIG. 2C configuration, however, has four rectifier bridges 252a1, a2, b1, b2 (REC1A, REC1B, REC2A and REC2B), instead of just two bridges as used in FIG. 2. These four bridges are given four group isolated inputs as four sets of three-phase AC input voltages. These voltages may be provided by secondary windings 152a1,a2,b1,b2 of transformer 101, whose voltages may be separated in phase by 15 degrees as shown. To supply such voltages, transformer 101 may include twelve (12) three-phase isolated windings, as compared to the six (6) windings used in FIGS. 1 and 2.

Figure 3:
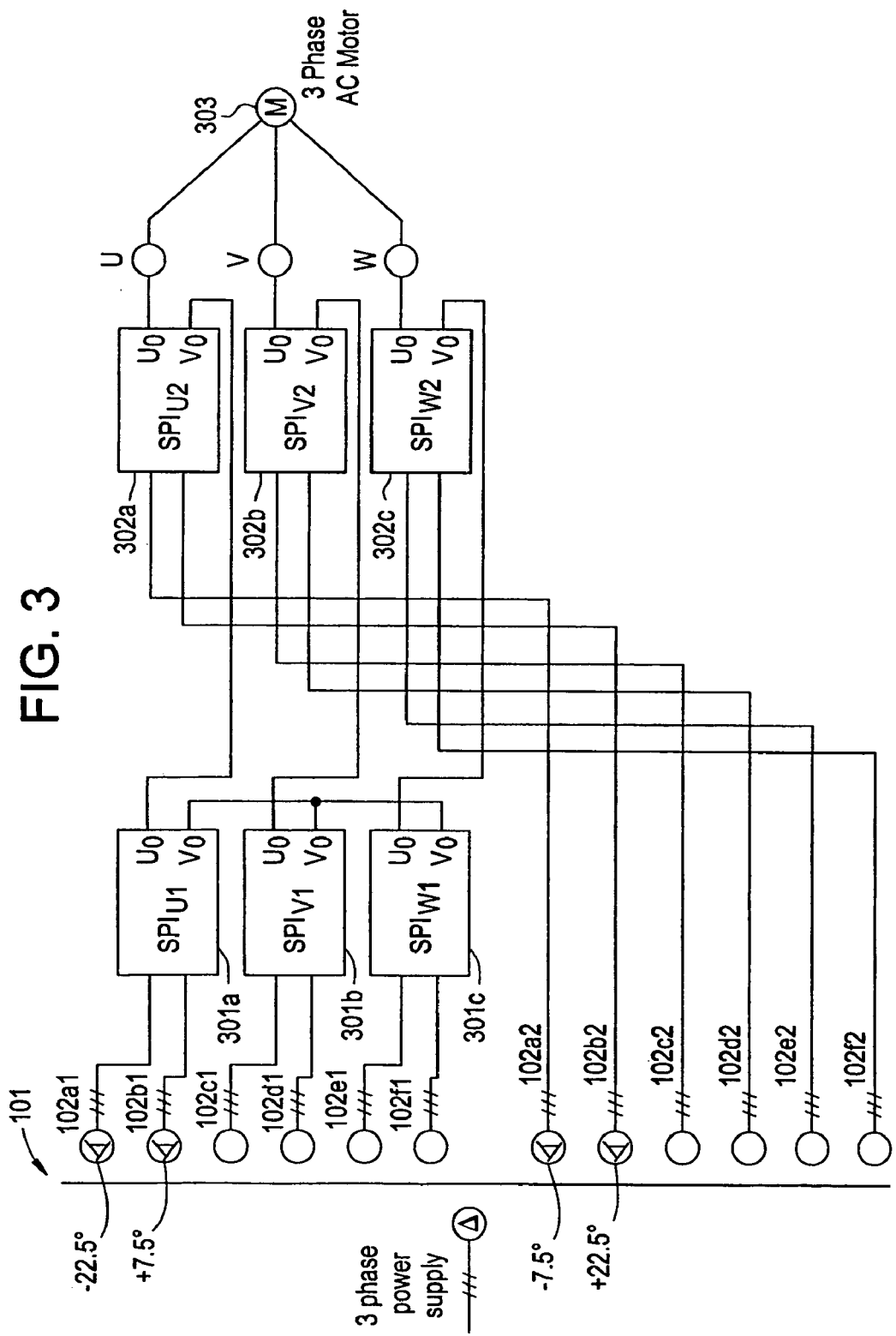
FIG. 3 illustrates a multi-inverter system that may be used to double the output voltage afforded by the FIG. 1 system.

FIG. 3 illustrates an example configuration that can be used to support higher output voltage levels than the FIG. 1 configuration, using inverters such as that shown in FIG. 2. In the FIG. 3 configuration, six single-phase inverters are connected, or stacked, in pairs to the phase lines of a three-phase AC motor. An input transformer 101 has twelve isolated three-phase secondary windings, and two three-phase isolated windings are connected to each single-phase inverter. The voltages of the secondary windings of transformer 101 may be separated in phase by 15 degrees among four windings for each line. For example, winding 102a1, 102b1, 102a2 and 102b2 for two single-phase inverters, 301a and 302a, for the U-phase line are illustrated as having phases separated by 15 degrees. Each phase line of the motor has two inverters connected in series. The phase line's first cells 301a-c (SPIu1, SPIv1 and SPIw1) have one of their output poles, such as their second respective poles (Vo), tied or short-circuited together.

The other output pole (Uo) of each first inverter is tied to the opposite output pole of a second inverter 302a-c (SPIu2, SPIv2, SPIw2) in the phase line, creating a forward polarity connection in which the phases positively combine. For example, as shown in each phase line of FIG. 3, the phase lines' first cells 301 have their first output pole (Uo) connected to the second, or opposite, output pole (Vo) of the phase lines' second cells 302. This connection effectively doubles the supported phase line voltage level, since the voltage outputs of the two cells may combine with one another, and the connection of opposite poles allows the two cells to combine at the same phase angle. The remaining output poles (Uo) of the second inverters 302a-c are then connected to the three phase inputs of a three-phase AC motor 303. In this configuration, the two inverter cells in each phase line generate the same AC voltage level and phase angle, thereby doubling the available voltage level for the line at the same phase. For example, the two inverters (301a and 302a, or SPIu1 and SPIu2) in the U-phase input each generate the same AC voltage level and the same phase as the U phase input to the three-phase AC motor 303. Similarly, inverters 301b and 302b (SPIv1 and SPIv2) each generate the same AC voltage level and generate the same phase as the V-phase input; and inverters 301c and 302c (SPIw1 and SPIw2) generate the same AC voltage and phase as the W phase input.

Figure 4:
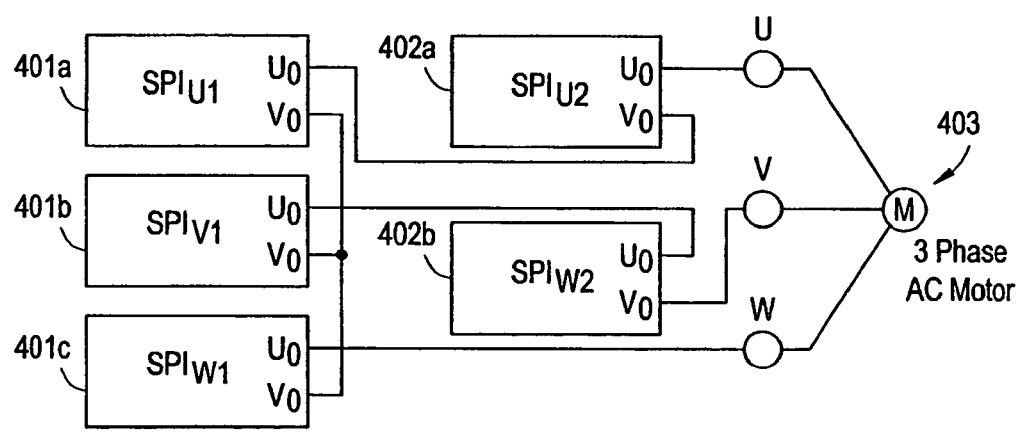
FIG. 4 illustrates a booster voltage inverter system using two additional single-phase inverter cells.

FIG. 4 illustrates a booster voltage inverter configuration that uses five similarly-rated (e.g., same voltage level) inverter cells, instead of the six used in the FIG. 2 configuration. In the FIG. 4 configuration, a three-phase AC motor 403 receives power from three phase input lines, one for each phase. Two of these lines use two inverter cells each, while the third line has just one inverter cell. Furthermore, the two pairs of cells in the first two phase lines are coupled differently from that shown in FIG. 3, as will be explained in greater detail below.

In this configuration, the first inverters 401a-c (SPIu1, SPIv1 and SPIw1) in each phase input line receive two isolated three-phase inputs from the transformer 101. This much resembles the configuration shown in FIG. 3.

The first phase line, having cells 401a (SPIu1) and 402a (SPIu2), also has a similar configuration with the first phase line in FIG. 3. Specifically, the first cell 401a has one output (Vo) tied in common with the corresponding outputs of the other first phase line cells 401b,c, and the other output (Uo) tied to the opposite output (the second output, Vo) of the second cell 402a in the first phase line, creating a forward polarity connection between the cells in the first phase line. For example, the two cells 401a, 402a both supply a common phase of output. The output of the first phase line is provided by second cell 402a (SPIu2), which has its first output (Uo) connected to a first phase input of the motor 403 (terminal U in FIG. 4).

The third phase input line has just one cell, 401c (SPIw1). The cell 401c generates a voltage having a third phase, and the cell's first output (Uo) is tied to the third phase input of the motor 403.

The second phase input line has two cells, 401b and 402b (SPIv1 and SPIw2), but the two are connected differently from the two in the first phase input line. In particular, the line's second cell 402b (SPIw2) is connected in reverse polarity, having an output pole (Uo) tied with the corresponding pole (Uo) of the line's first cell 401b (SPIv1). Furthermore, instead of generating an output voltage with the same phase as the line's first cell 401b, the line's second cell 402b generates the phase generated by the single cell 401c (SPIw1) in the third phase line (e.g., the single-cell phase line, or the W phase in FIG. 4). The second phase line provides its output via an output pole (Vo) of the second cell 402b, which is connected to the second phase input line of the three-phase motor 403.

Accordingly, in the FIG. 4 configuration, cells 401a and 402a (SPIu1 and SPIu2) generate voltages at the same phase as one another; cell 401b (SPIv1) generates voltages at a second phase (120 degrees different from first phase, 401a and 402a); and cells 401c and 402b (SPIw1 and SPIw2) generate voltages at a third phase (120 degrees different from first phase and second phase). Furthermore, these cells may all generate the same voltage amplitude. Using this configuration allows some cost savings as compared to the six-cell configuration in FIG. 3, since fewer cells are used, and yet this configuration can still support the 6.6 kV standard voltage level supported by the FIG. 3 configuration. These benefits will be explained in greater detail below.

Figure 5:
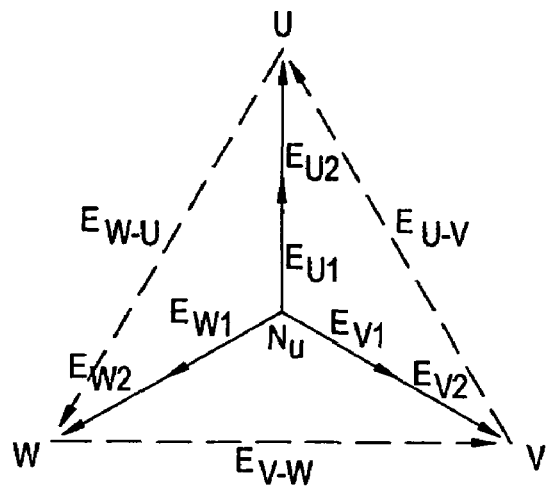
FIG. 5 illustrates a vector configuration for the output of a system as shown in FIG. 3.

FIG. 5 illustrates the vector configuration for the system shown in FIG. 3. As shown, point Nu represents a neutral point that is a common point connected with the first cells (301a-c, or SPIu1, SPIv1 and SPIw1) in each phase input line, and Eu1, Ev1, Ew1, Eu2, Ev2 and Ew2 are phase voltage vectors output by each of the cells 301a-c and 302a-c, respectively (e.g., SPIu1, SPIv1, SPIw1, SPIu2, SPIv2 and SPIw2, respectively). Vectors Eu-v, Ev-w and Ew-u are phase-to-phase voltage vectors at terminals U, V and W respectively. When all six cells generate the same voltage amplitude (denominated, 'e'), and the three phases generated by cells 301a-c and 302a-c are 120 degrees out of phase with one another, then the resulting phase-to-phase output voltages Eu-v, Ev-w and Ew-u are $2\sqrt{3}$ times the individual cell voltage e. For example, if inverter cells 301 and 302 are rated at 2.5 kV, then the FIG. 3 configuration can support $(2.5 \text{ k})\times(2\sqrt{3})$=8.6 kV.

Using these same inverter cells in the FIG. 1 configuration would support half of that voltage, or 4.3 kV. Accordingly, in the United States, the FIG. 1 configuration can use 2.5 kV-rated cells and support a standard 4160V system, while the FIG. 3 configuration can use 2.5 kV-rated cells and support a standard 6.6 kV system.

Figure 6A:
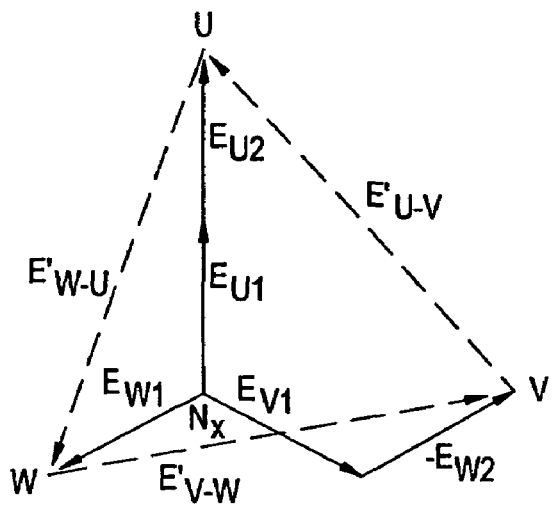
FIGS. 6a and 6b illustrate a vector configuration for the output of a system as shown in FIG. 4.
Figure 6B:
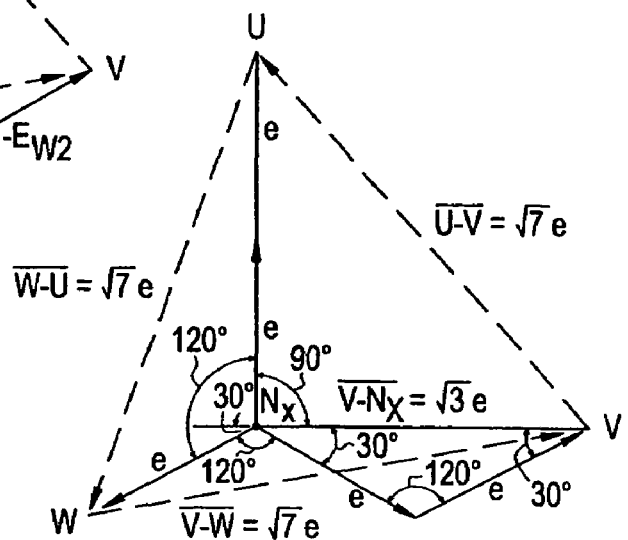

FIGS. 6a and 6b illustrate the vector configuration for the arrangement shown in FIG. 4. Here, Eu1, Ev1, Ew1, Eu2 and Ew2 are phase voltage vectors of the output voltages of the cells 401a-c and 402a-b (SPIu1, SPIv1, SPIw1, SPIu2 and SPIw2), respectively, shown in FIG. 4. E'u-v, E'v-w and E'w-u are voltage vectors for the phase-to-phase voltages at terminals U, V and W in FIG. 4, and Nx is again a common connection point of the first cells in each of the phase lines (cells 401a-c, or SPIu1, SPIv1 and SPIw1). As apparent in these figures, the use of the sole cell 401c (SPIw1) in the third phase line results in a shortened amplitude on that phase line (e.g., the vector Ew1), while the reverse polarity connection of the second line's second cell 402b (SPIw2) causes a reversal of phase when the cell's output (e.g., the vector "-Ew2") is combined with the output of the first cell 401b (SPIv1). FIG. 6b illustrates the same vector relationship from FIG. 6a, but with trigonometric notations showing the supportable voltages in the FIG. 4 configuration. As will be explained, when the FIG. 4 configuration uses the 120 degree phase separation between cells 401a-c, and the same types of cells (e.g., voltage-rated 'e'), the FIG. 4 configuration supports a phase-to-phase voltage of $\sqrt{7}$ (or 2.6457) times the voltage e supported by each individual cell. The following calculations bear this out, where U-V, V-W and W-U are the vector lengths of the phase-to-phase voltage between terminals U and V, V and W, and W and U respectively, and V-Nx is the vector length of the voltage between terminal V and the common point Nx:

$$\overline{V-Nx} = \sqrt{e^2 + e^2 - 2e \cdot e\cos(120°)}$$
$$= \sqrt{e^2 + e^2 - 2e^2(-1/2)}$$
$$= \sqrt{3}\,e$$

$$\overline{U-V} = \sqrt{(2e)^2 + \left(\sqrt{3}\,e\right)^2 - 2(2e)\left(\sqrt{3}\,e\right)\cos(90°)}$$
$$= \sqrt{4e^2 + 3e^2 - 4\sqrt{3} \cdot 0}$$
$$= \sqrt{7}\,e$$

$$\overline{V-W} = \sqrt{\left(\sqrt{3}\,e\right)^2 + e^2 - 2\left(\sqrt{3}\,e\right) \cdot e\cos(150°)}$$
$$= \sqrt{3e^2 + e^2 - 2\sqrt{3}\,e^2\left(-\frac{\sqrt{3}}{2}\right)}$$
$$= \sqrt{3e^2 + e^2 + 3e^2}$$
$$= \sqrt{7}\,e$$

$$\overline{W-U} = \sqrt{(2e)^2 + e^2 - 2(2e)e\cos(120°)}$$
$$= \sqrt{4e^2 + e^2 - 4e^2(-1/2)}$$
$$= \sqrt{7}\,e$$

As shown in these calculations, the FIG. 4 embodiment can be used to support voltage levels of $\sqrt{7}$ times the voltage provided by an individual cell. If the same 2.5 kV-rated cells are used as discussed above, then the FIG. 4 system can support $\sqrt{7}$ (2.5 kV), or 6.614 kV. Accordingly, the FIG. 4 configuration can support the U.S.A.'s standard 6.6 kV voltage using one fewer cell than the six-cell system shown in FIG. 3. Of course, the FIG. 4 configuration can also support the 4160V standard as well.

Figure 7:
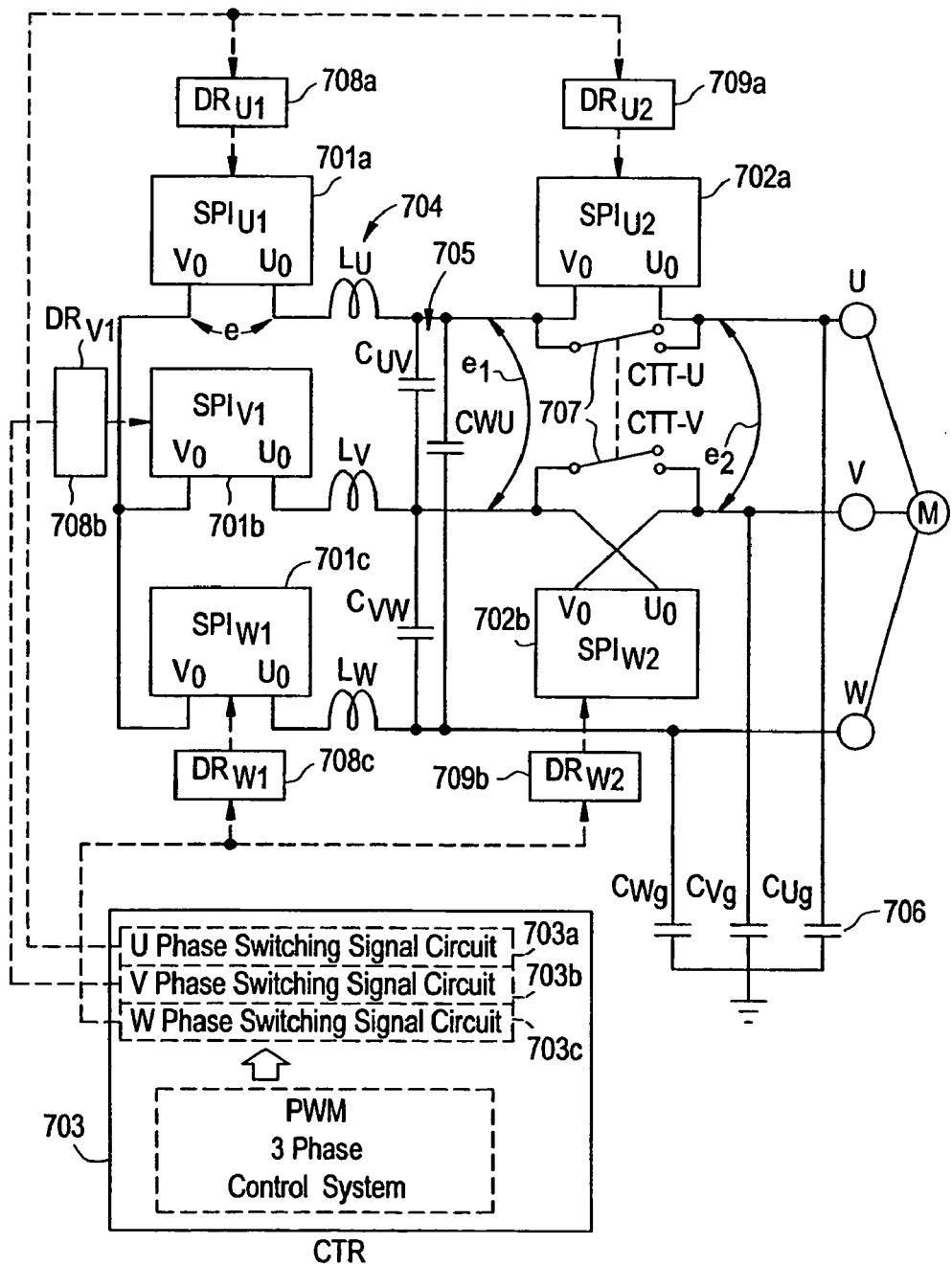
FIG. 7 illustrates an alternative configuration for the FIG. 4 system, employing backup circuitry.

FIG. 7 illustrates an alternative configuration, in which circuitry is added to accommodate potential failures in one or more of the cells used in the FIG. 4 system. In the FIG. 7 configuration, cells 701a-c and 702a-b (SPIu1, SPIv1, SPIw1, SPIu2 and SPIw2) may be the same as cells 401a-c and 402a-b (also SPIu1, SPIv1, SPIw1, SPIu2 and SPIw2) discussed above in FIG. 4, with the same series-connected cells 701a, 702a (SPIu1, SPIu2) in the first phase line, the reverse-connected (and supplying a different phase) cell 702b (SPIw2) in the second phase line, and a single cell 701c (SPIw1) in the third phase line. FIG. 7 also illustrates a control circuit 703 (CTR), which may be an NPC inverter control circuit that sends switching signals to the various transistors in cells 701a-c and 702a-b. Control circuit 703 may include a U phase switching signal circuit 703a, V phase switching signal circuit 703b and W phase switching signal circuit 703c, each of which may provide isolated switching signals to the cells in their corresponding phases. The isolated switching signals may help avoid effects of harmful interference experienced along the route from the control circuit 703 to the various cells, with optical signals as one example of a type of isolated switching signal that may be used. The switching signals are used to control the state of the various inverter transistors, and the switching signals may be converted at transistor drive circuits 708a-c (DRu1, DRv1 and DRw1) and 709a-b (DRu2 and DRw2) from a first isolated format (e.g., optical) to a second format (e.g., electric drive signals) suitable for controlling the transistors. For example, U phase switching signal circuit 703a may send isolated switching signals to transistor drive circuits 708a and 709a, which may in turn convert those signals to electric drive signals, and supply the resulting electric drive signals to cells 701a and 702a in the U phase. Similarly, V phase switching signal circuit 703b may send isolated switching signals to transistor drive circuit 708b, which may convert the switching signals to electric drive signals for cell 701b in the V phase; and W phase switching signal circuit 703c may send isolated switching signals to transistor drive circuits 708c and 709b, which may convert the switching signals to electric drive signals for cells 701c and 702b in the W phase.

As with the FIG. 4 configuration, the cells in the first phase line, 701a and 702a (SPIu1 and SPIu2), may generate the same voltage amplitude and phase as one another; and the cells 701c and 702b (SPIw1 and SPIw2), although located in different phase lines, may generate the same voltage amplitude and phase as one another. As with FIG. 4, the second line's second cell 702b (SPIw2) may be connected in reverse polarity with the line's first cell. The third cell 701c (SPIw1) may be alone in the third phase line, and may generate voltage at a third phase (e.g., the W phase), which is supplied to the motor's third phase line input.

FIG. 7 also shows a number of additional components. Reactors 704 (Lu, Lv, Lw) and capacitors 705 (Cuv, Cvw, Cwu) may form a line filter to trap surge voltages generated by voltage changes (dV/dt) occurring with PWM switching of the main transistor devices in the single phase NPC cells 701a-c, 702a-b. Grounding capacitors 706 (Cwg, Cvg, Cug) may also be used to fix the neutral point of the three phase output voltage at the ground potential.

To accommodate failures of one or more of the cells, the FIG. 7 configuration includes failure switches 707 (CTT-U, CTT-V). These switches are placed in a position to short-circuit one or more of the cells in a phase line, such as a line's secondary cells 702a-b (or cells 402a-b). The switches are kept open during normal operation, and they may be closed when one or more of the cells in the system experience a failure. Different configurations can be used. For example, the failure switches may be located across the secondary cells in the phase lines, and upon a cell failure, closing the switches shorts those secondary cells out, and converts the system back to a three-cell configuration, similar to that shown in FIG. 1. By shorting out the secondary cells (e.g., cells 702a-b), those cells become available for removal without stopping operation of the system. The system may have to run at a lower capacity when the failure switches are closed, but that is preferable to a complete shutdown. If the failure occurred in one of the primary cells (e.g., cells 701a-c), the shorted-out secondary cells may be removed and used to replace the failed primary cell. In this manner, the system can quickly recover from a failure in a primary cell, and can remain in operation however long it takes to obtain a replacement for the failed cell.

Figure 7A:
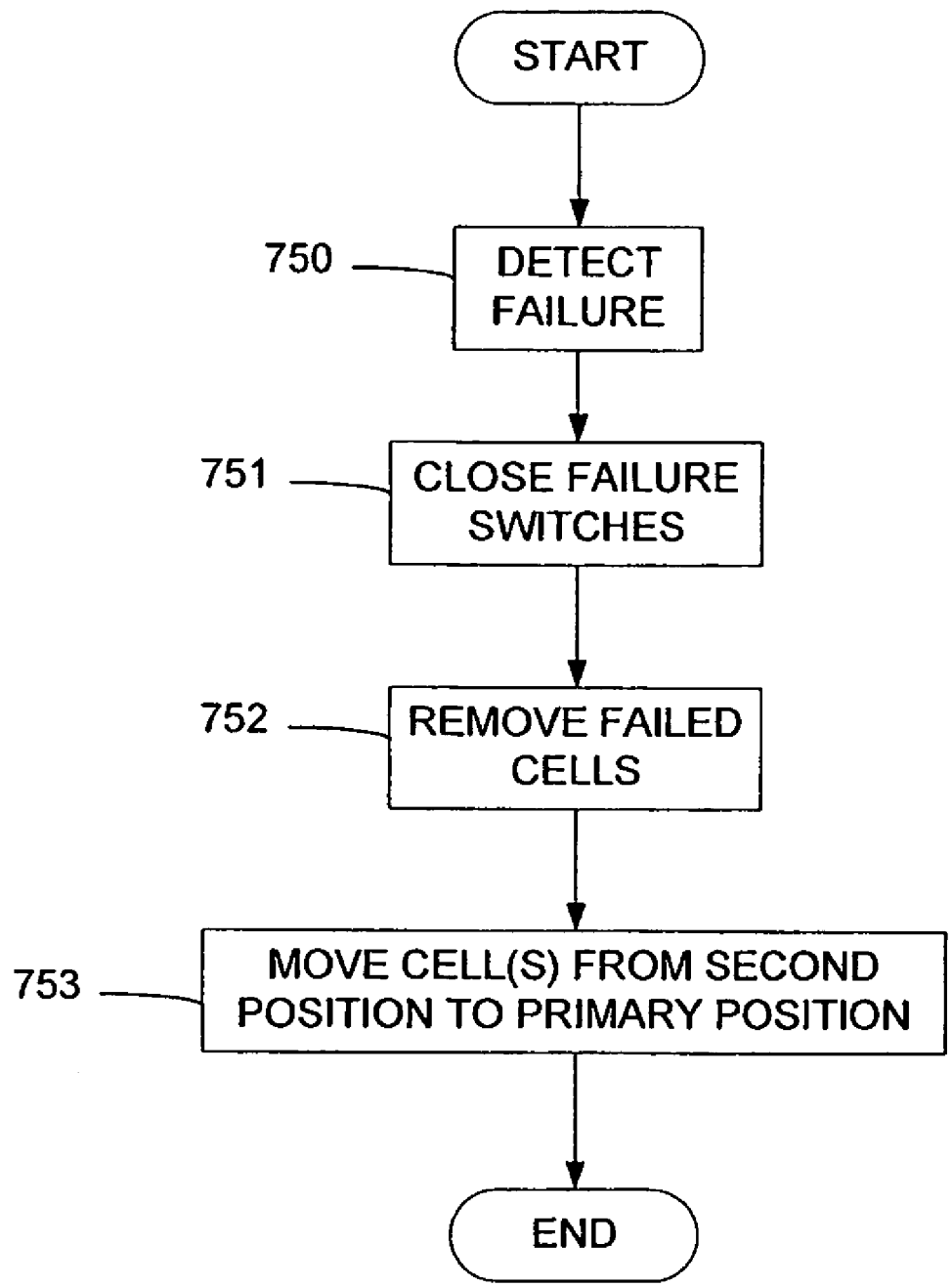
FIG. 7a illustrates an example method using this backup circuitry.

FIG. 7a illustrates an example method when a failure occurs. In step 750, a failure in one or more of the cells 701a-c, 702a-b is detected. In response to the failure, in step 751, the failure switches are both closed to short circuit the output poles of one or more of. the cells. With the closing of these switches, the system may operate as a three-cell system instead of a five-cell system. Then, in step 752, the failed cell(s) are removed, and in step 753, if one or two of the first cells in the phase lines (e.g., cells 701a-c) experienced a failure, then one or both of cells 702a-b are used as spares to replace those failed cells, so the system can continue operation as a three-cell system.

FIG. 8 is a table showing one example voltage output range that can be supported by the FIG. 7 configuration. As shown, the designations "e1" and "e2" refer to phase-to-phase voltages when the failure switches are closed and open, respectively. As described above, when 2.5 kV-rated cells are used, the supported phase-to-phase voltages are $\sqrt{3}e$, or 4.3 kV, when the switches 707 are closed, and when the switches 707 are open, the configuration supports voltages of $\sqrt{7}e$, or 6.6 kV. The table in FIG. 8 also shows the allowable apparent power (kVA) when the cells are rated at 660 kVA. When the switches 707 are closed, the calculation yields 3×660 kVA=1980 kVA; and when the switches 707 are open, the calculation yields 1980 kVA×(6.6 kV/4.3 kV)=3039 kVA.

Figure 9:
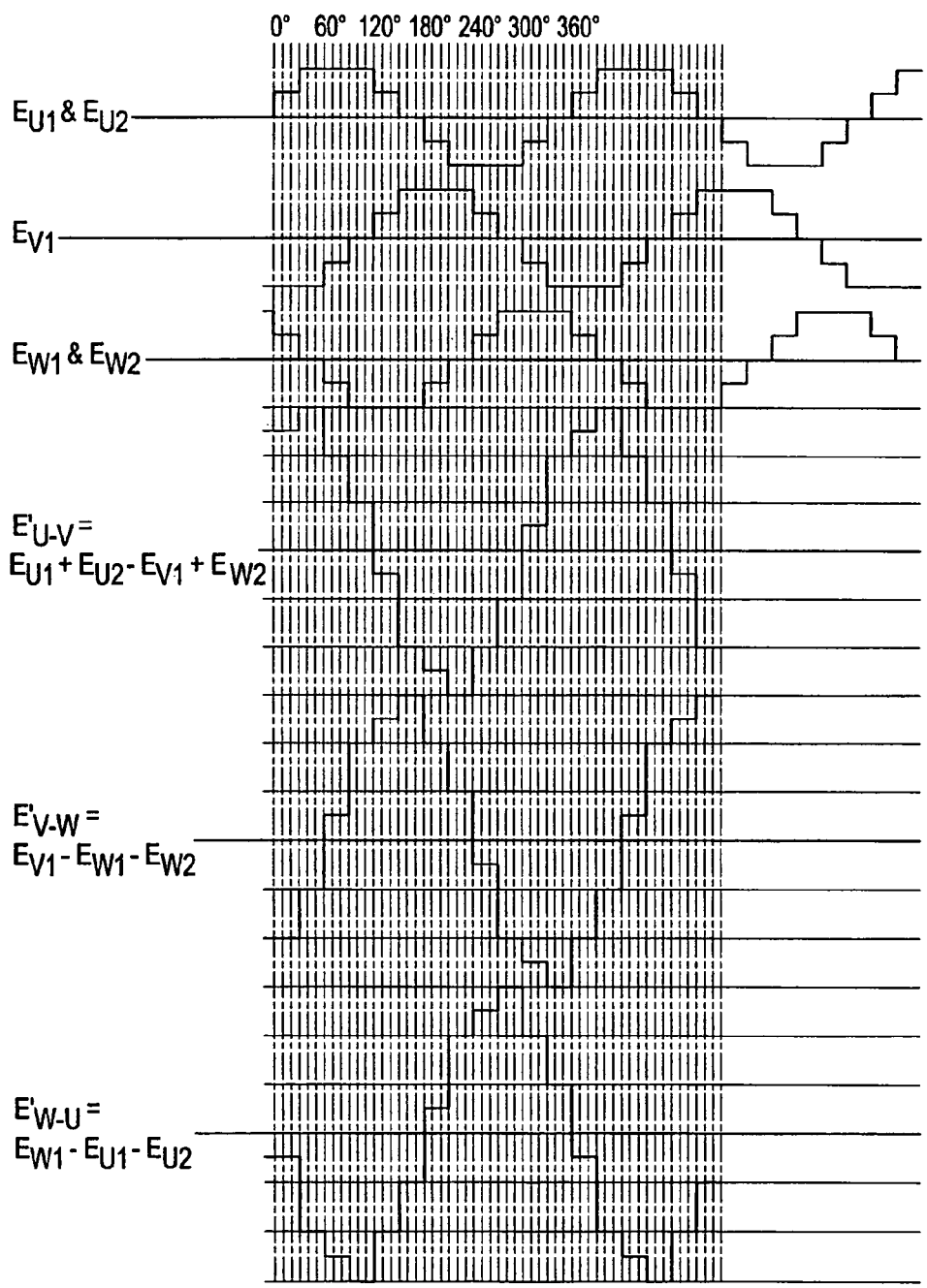
FIG. 9 illustrates example wave form diagrams for the FIG. 4 and/or FIG. 7 configuration, using a square wave single cell output.

FIG. 9 illustrates example waveforms showing the output when the cells 401a-c, 402a-b (or 701a-c, 702a-b) generate the same 5-level square wave forms. Phase-to-phase voltages E'u-v, E'v-w and E'w-u at the output terminals in FIG. 4 are calculated from the vector relationship in FIG. 6 as follows:

$$E'u-v=Eu1+Eu2-Ev1+Ew2$$

$$E'v-w=Ev1-Ew1-Ew2$$

$$E'w-u=Ew1-Eu1-Eu2$$

Figure 10:
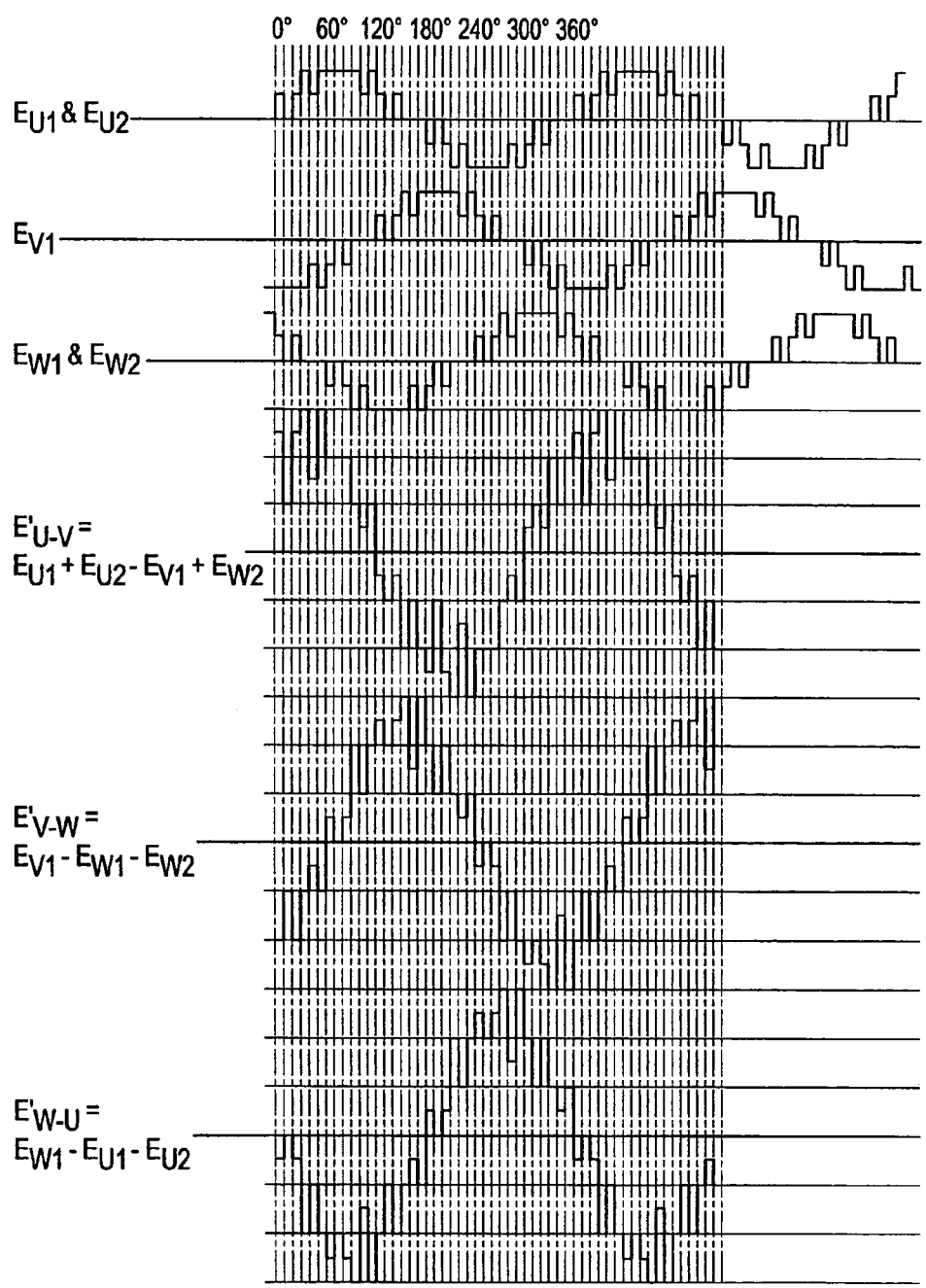
FIG. 10 illustrates example wave form diagrams for the FIG. 4 and/or FIG. 7 configuration, using a pulse-width modulated (PWM) cell output.

FIG. 10 illustrates example waveforms when the cells 401a-c, 402a-b (or 701a-c, 702a-b) generate the same 5-level simple PWM wave forms. The phase-to-phase vector relationships are as described above for FIG. 9. These wave forms are closer to a sine wave than the FIG. 9 waves, although some harmonic distortion is still included because the PWM wave forms generated by single phase cells are simple PWM wave forms, and not sine-wave modulated wave forms.

The various calculations provided herein have a degree of mathematical precision that may be approximated in systems employing the features described herein. For example, although inverter cells may be described above as generating the same voltage levels and at certain phase angles, engineering and manufacturing tolerances may adjust the values achieved in implementation, such that the actual values may slightly vary, with the voltages and phases being substantially as described.

The various features, examples and embodiments described above are not intended to limit the scope of the present application, and many of the components may be divided, combined and/or subcombined with one another as desired. Accordingly, the scope of the present patent should only be defined by the following claims.

I claim the following:

1. A voltage system supplying three-phase power, comprising:
   three phase lines, each having an output terminal wherein one of said phase lines has a different number of single-phase inverter cells from another one of said phase lines;
   a first of said phase lines having first and second single-phase inverter cells connected in series to a first of said output terminals;
   a second of said phase lines having third and fourth single-phase inverter cells connected in series to a second of said output terminals, said fourth inverter cell connected with reverse polarity to said third inverter cell, as compared to a polarity of the connection between said first and second single-phase inverter cells; and
   a third of said phase lines having a fifth single-phase inverter cell connected to a third one of said output terminals.

2. The system of claim 1, wherein said first and second inverter cells generate output having a first phase angle; said third inverter cell generates output having a second phase angle, said second angle being different from said first; and said fourth and fifth inverter cells generate an output having a third phase angle, said third angle being different from said first and second phase angles.

3. The system of claim 2, wherein said first, second and third phase angles are separated by 120 degrees in phase.

4. The system of claim 2, wherein said inverter cells are each supplied with at least two isolated three-phase inputs.

5. The system of claim 1, wherein said inverter cells generate substantially the same output voltage amplitude.

6. The system of claim 1, wherein each of said inverter cells includes first and second output poles.

7. The system of claim 6, wherein the second output poles of said first, third and fifth inverter cells are electrically connected together with no intervening inverter cells; a first output pole of said third inverter cell is electrically connected to a corresponding first output pole of said fourth inverter cell with no intervening inverter cells; and a first output pole of said first inverter cell is tied to a second output pole of said second inverter cell with no intervening inverter cells.

8. The system of claim 1, wherein said inverter cells are single phase neutral point clamp inverter cells.

9. The system of claim 1, wherein said first, second, third, fourth and fifth inverter cells are the only inverter cells in the system supplying power to said output terminals.

10. The system of claim 1, wherein said inverter cells generate the same 5-level pulse-width modulated (PWM) wave forms.

11. The system of claim 1, wherein said inverter cells generate the same 5-level square wave forms.

12. A voltage system supplying three-phase power, comprising:
   three output terminals, one for each phase of said three-phase power supplied by said system;
   first and second single-phase neutral point clamp inverter cells connected in series to a first of said output terminals, wherein said first and second cells provide outputs at a first phase;
   third and fourth single-phase neutral point clamp inverter cells connected in series to a second of said output terminals, said fourth inverter cell connected with reverse polarity to said third inverter cell as compared to a polarity of the connection between said first and second single phase neutral point clamp inverter cells, wherein said third cell provides an output at a second phase different from said first phase; and
   a fifth single-phase neutral point clamp inverter cell connected to a third one of said output terminals, wherein said fifth and fourth inverter cells provide output voltages at a third phase different from said first and second phases, and wherein said first, second and third phases are 120 degrees apart in phase.

13. A voltage system supplying three-phase power, comprising: only five single-phase inverter cells that generate substantially the same output voltage amplitude to supply three-phase power; three output terminals, one for each phase of said three-phase power supplied by said system; first and second ones of said single-phase inverter cells having a first phase angle output connected in series to a first of said output terminals; a third one of said single-phase inverter cells having a second phase angle output different from said first phase angle, and a fourth one of said single-phase inverter cells having a third phase angle output different from said first and second phase angles, connected in series to a second of said output terminals, said fourth inverter cell connected with reverse polarity to said third inverter cell; and a fifth one of said single-phase inverter cells, having the same third phase angle output as the fourth inverter cell, connected to a third one of said output terminals.

* * * * *